United States Statutory Invention Registration [19]

Nicholson et al.

[11] Reg. Number: H264

[43] Published: May 5, 1987

[54] ELECTROCHROMIC DISPLAY DEVICE

[75] Inventors: Margie M. Nicholson, San Marino; Thomas P. Weismuller, Orange, both of Calif.

[73] Assignee: The United States of America as represented by the Secretary of the Air Force, Washington, D.C.

[21] Appl. No.: 632,179

[22] Filed: Jul. 19, (Under 37 CFR 1.47) 1984

[51] Int. Cl.[4] ..... G02F 1/01

[52] U.S. Cl. ..... 350/357; 422/57

[56] References Cited

U.S. PATENT DOCUMENTS

| | | | |
|---|---|---|---|
| 3,847,468 | 11/1974 | Clasen et al. | 350/160 |
| 4,184,751 | 1/1980 | Nicholson | 350/357 |
| 4,306,774 | 12/1981 | Nicholson | 350/357 |
| 4,371,236 | 2/1983 | Nicholson | 350/357 |
| 4,427,267 | 1/1984 | Collins et al. | 350/357 |
| 4,456,337 | 6/1984 | Nicholson | 350/357 |
| 4,474,433 | 10/1984 | Nicholson et al. | 350/357 |

OTHER PUBLICATIONS

U.S. Patent Application Ser. No. 06/530,041, filed 12/11/81, for Chemical Color Conversion of Electrochromic Display Material, now abandoned.

*Primary Examiner*—Stephen C. Buczinski
*Assistant Examiner*—Linda J. Wallace
*Attorney, Agent, or Firm*—Donald J. Singer; Charles E. Bricker

[57] ABSTRACT

A chemically coupled color-changing matrix display device is disclosed wherein the display material is a surfactant-treated color changing metal-diphthalocyanine complex. For example, lutetium diphthalocyanine may be treated with a mixture of silicone glycol and imidazoline surfactants to provide a deposit having substantially the same color as electrolytically cycled deposits of the same material.

10 Claims, 5 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ELECTROCHROMIC DISPLAY DEVICE

RIGHTS OF THE GOVERNMENT

The invention described herein may be manufactured and used by or for the Government of the United States for all governmental purposes without the payment of any royalty.

BACKGROUND OF THE INVENTION

This invention relates to electrochromic devices. In one aspect it relates to electrically controllable display devices. In another aspect it relates to electrically tunable optical or light filters. In yet another aspect it relates to a chemical sensor device which employs a color changing film.

There are many uses for electrically controllable display devices. A number of such devices have been in commercial use for some time. These display devices include liquid crystal displays, light emitting diode displays, plasma displays, and the like. Light emitting diode and plasma display panels both suffer from the fact that they are active, light emissive devices which require substantial power for their operation. In addition, it is difficult to fabricate light emitting diode displays in a manner which renders them easily distinguishable under bright ambient illumination. Liquid crystal displays suffer from the disadvantage that they are operative only over a limited temperature range and have substantially no memory within the liquid crystal material. Further, the visibility of many liquid crystal displays decreases as the viewer moves a few degrees off axis.

Electrochromic displays have been developed which display information through a change in color of portions in the display. In certain of these displays the color change is accomplished by way of reversible electroprecipitation of certain cations onto a transparent electrode. In certain other of these displays a metal ion in the electrolyte is reversibly reacted with a transparent electrode. In these known electrochromic displays, coloration is induced employing an external potential. By reversing the original potential, or by applying a new potential, it is possible to cancel, erase or bleach the visible coloration. These steps of color induction and erasure are defined as cycling.

Because of their operative mechanisms, the known electrochromic display devices have suffered the drawbacks of requiring substantial power and/or time to write or erase displayed information.

Rare earth diphthalocyanines are known to have electrochromic properties in which the color of the diphthalocyanine can change over a period of about 8 seconds upon application of a potential difference across an electrochemical cell having a diphthalocyanine film on one of the electrodes. The diphthalocyanine does not require large amounts of power to change color, but the long period required for the color to change makes known diphthalocyanine performance characteristics unacceptable when measured against display requirements.

Nicholson, U.S. Pat. No. 4,184,751 describes electrochromic display devices using a metal diphthalocyanine complex as the electrochromic material in which displayed information can be switched in 200 milliseconds or less by constructing the device so that the apparent RC time constant of the overall structure is one second or less. A multi-color, i.e., more than two color, display is achieved through use of a range of voltages applied between display and counter electrodes. Color reversal of displayed information and the background against which it is displayed is achieved through use of display electrodes in the background portions of the viewing area as well as in the character segments.

In a simpler type of display device where color reversal is not required the background portions of the viewing area are often provided with deposits of the display material surrounding and conforming to the outlines of the segmented character electrodes. This feature is intended to provide a uniform appearance to obscure the character electrodes when the display device is in the erase condition.

In such a device, the metal diphthalocyanine display material has an initial color in both the background regions and on the character or display electrodes. Upon electrical cycling, however, the display material on the display electrodes typically does not return to the precise initial color. This is objectionable in a display device.

Several approaches have been proposed for use in solving the problem of the failure of the erased display electrodes to match the color of the background. Most such proposals are relatively expensive either in terms of materials or processing steps. Nicholson et al., in U.S. patent application Ser. No. 330,041, filed Dec. 11, 1981, now abandoned, disclose a simple, inexpensive method for treating an electrochromic display material in order that the background and cycled materials have substantially the same color. The method comprises treating a deposited display material with a liquid vehicle containing substituted imidazoline and silicone glycol surfactants, then driving the liquid vehicle from the deposited display material. Where the display material is lutetium diphthalocyanine, the resulting color is olive-green. In the written state, the color is bright green; in the erased state the color is olive-green.

Matrix display devices contain one or more arrays of many small elements or dots of color changing material that can be selectively activated or switched to form virtually any alphanumeric or graphic pattern. To create such patterns and erase them at will some means must be provided to access each element independently without activating those in the surrounding area. It has been proposed to build an integrated drive matrix of thin-film transistors into a display device so that each element is provided, in effect, with a separate switch connecting it to the power supply. A simpler approach is to use a multiplexed addressing scheme. Nicholson U.S. patent application Ser. No. 327,856, filed Dec. 7, 1981, now U.S. Pat. No. 4,456,337, describes a chemically coupled display device which may be addressed by direct multiplexing of two sets of parallel conductive, linearly-extending electrodes disposed at right angles.

Electrically tunable filters consist of a film of color-changing filter material wherein the color of the filter is electrically tunable. Nicholson, U.S. patent application Ser. No. 451,294 filed Dec. 20, 1982, now U.S. Pat. No. 4,501,472 describes an electronically tunable filter and an electronically switchable light valve which is capable of being reversibly changed from light transmissive in one state to opaque in another.

It is an object of the present invention to provide an improved chemically coupled color-changing display device.

It is another object of this invention to provide an improved tunable electrochromic filter.

It is yet another object of this inventlon to provide an improved non-electronic chemical sensing device.

Other objects, aspects, and advantages of the present invention will be apparent to those skilled in the art.

SUMMARY OF THE INVENTION

In accordance with one embodiment of the present invention there is provided a low power, rapid switching, electrochromic device comprising a surfactant-treated electrochromic metal diphthalocyanine complex display matrix and an electrolyte which comprises at least one chemical color switching agent.

In accordance with another embodiment of the present invention there is provided an electronically tunable color filter comprising a surfactant-treated electrochromic metal diphthalocyanine complex filter material and an electrolyte which comprises at least one chemical color-switching agent.

In accordance with yet another embodiment of the present invention there is provided a non-electronic chemical sensing device comprising a surfactant-treated electrochromic metal diphthalocyanine complex and a suitable support material.

DESCRIPTION OF THE INVENTION

Figure 1:
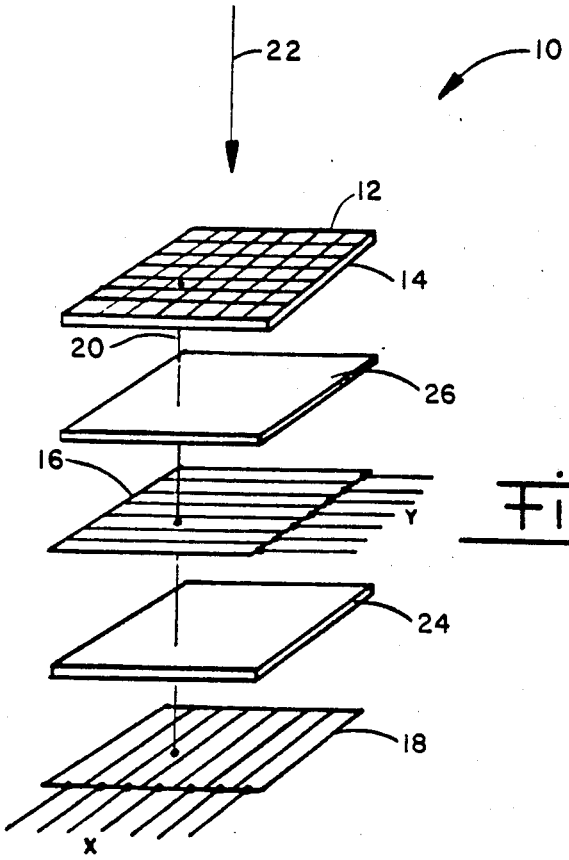
FIG. 1 is an exploded view of the internal elements of a color-changing display device in accordance with the invention.

Referring now to FIG. 1, there are shown the essential internal parts of a chemically coupled color-changing matrix display device 10. A display matrix 12 comprises a plurality of coplanar, electronically isolated dots or elements of a solid, insoluble display material preferably disposed in orthogonal rows and columns on a planar surface of an insulating substrate 14. The display material is an insoluble dye which is capable of reversibly changing color by reaction with soluble oxidizing and reducing agents that are electrochemically generated; it is described hereinafter. The substrate 14 may be of any compatible material such as, for example, a plastic, glass or alumina plate or a plastic film. The substrate 14 is preferably of a material which has substantially the same thermal expansion coefficient as the color-changing material disposed thereon so as to promote good adhesion thereto. The better the adhesion, the longer will be the life of the display device 10.

The remainder of the display device parts in FIG. 1 comprise drive matrix means for electrochemically generating the reactants, i.e.. the soluble oxidizing and reducing agents. The reactants interact with the color-changing material to alter its color. The drive matrix is disposed parallel to and spaced apart from the planar surface of the substrate 14 on which the display matrix 12 is disposed.

The drive matrix includes a first linear array or set of generator electrodes 16 and a second linear array or set of counter electrodes 18. Each electrode is a relatively long and narrow, isolated conductive unit disposed parallel to the other electrodes of its array. The electrodes of each linear array are preferably disposed at right angles to or orthogonal to the electrodes of the other linear array in a distinct electrode plane spaced apart from and parallel to the other electrode plane. Both electrode planes are preferably parallel to the planar surface of the substrate 14 on which the display matrix 12 is disposed. The generator electrode plane is closer to the display matrix 12 inasmuch as it is interposed between the counter electrode plane and the display matrix 12.

Each intersection of an individual generator electrode 16 and an individual counter electrode 18 defines an electrode crossover region in which reactants for effecting color change are to be generated when an electrical signal of appropriate magnitude and polarity is applied across a selected generator electrode-counter electrode combination.

In this embodiment, the substrate 14 acts as a spacer between the display matrix 12 and the generator electrodes 16. The substrate and spacer 14 is porous enough to permit ready access of the electrochemically generated reactants to the color-changing material.

The electrodes of one of the linear arrays are aligned with the rows of display elements in the display matrix 12 while the electrodes of the remaining linear array are aligned with the columns thereof. Therefore, each color-changing dot or element of the display matrix 12 is aligned with a distinct generator electrode-counter electrode crossover region. This alignment is illustrated in FIG. 1 wherein the dashed line 20 is shown passing through the intersection or crossover region defined by the third counter electrode 18 from the left edge and the third generator electrode 16 from the front edge in their respective electrode planes. The line 20 is shown extended to the display matrix 12 where it intersects the display element situated at coordinates $X=3$, $Y=3$ relative to an origin at the intersection of the left and front edges of the display matrix plane.

The display 10 is intended to be viewed in the direction indicated by the arrow 22. This gives the more direct observation of the display matrix 12. If the display 10 is to be front-lighted, i.e., viewed by reflected light, the counter electrodes 18 can be opaque. However, for a back-lighted or projected display, the counter electrodes 18 must either be transparent or semi-transparent. An open mesh structure will meet the latter requirement. The generator electrodes 16 are also required to have an open-mesh or similar structure so that reactants formed there can escape and diffuse to the display matrix 12. For a back-lighted or projected display, the generator electrodes 16 must be sufficiently transparent for viewing by transmitted light.

Interposed between the generator electrodes 16 and the counter electrodes 18 is a selective separator 24 which, in effect, divides the interior of the display device into two compartments. The first compartment contains the generator electrodes 16 and the display matrix 12 while the second compartment contains the counter electrodes 18. The selective separator 24 prevents loss of electrochemically generated reactant species from the compartment containing the generator electrodes 16 and the display matrix 12. Stated alternatively, the separator 24 excludes or confines the electrochemically generated reactant species away from the compartment containing the counter electrodes 18. Thus, the generated reactants are preserved for reaction with display material only. In addition, the separator 24 is required to confine certain soluble chemical species to the compartment of the generator electrodes 16 and display matrix 12 and prevent contamination of the counter electrodes 18 where these species could interfere with the operation of the counter electrodes 18. Similarly, the separator 24 is required to confine certain other soluble chemical species to the compartment of the counter electrodes 18 and prevent contamination of the generator electrodes 16 and of the display material in the display matrix 12 where these other species could interfere with the operation of the generator electrodes 16 or with the operation of the display material. However, the separator 24 does permit the passage of current-carrying ions between the generator and counter electrode arrays 16 and 18. A semi-permeable separator 24 made of, for example, an ion exchange resin is preferred but a retentive diffusion barrier containing electrolyte may serve as an adequate separator 24 in some cases. An ion exchange resin exhibits selective permeability due to its ability to transport primarily cations or anions. A retentive diffusion barrier retards the undesired passage of chemical species because of its microporous structure. The diffusion barrier can be of a microporous layer of inert material fabricated by screening. Since these porous layers are usually white, they can serve as optical backing in a front-lighted display or as a translucent light-transmitter in a back-lighted display. Alternatively, the separator 24 may be a molecular filter having selective permeability due to its ability to transport only chemical species smaller than a certain size. Excessive thickness of the separator 24 will diminish pattern resolution in the drive matrix.

The generator electrodes 16 are preferably of a highly conductive, inert material such as, for example, gold. The counter electrodes 18 preferably include an electrochemical couple with insoluble active components, such as silver-silver bromide, which will not impose special requirements on the separator 24. Soluble counter electrode couples such as iodide-triiodide are not ruled out, however, if an appropriate separator 24 is used. If both members of the counter-electrode couple are soluble, as in the case of iodide-triiodide, the separator 24 must be retentive enough to exclude the more active member, such as triiodide, from the region of the display matrix 12.

The layer shown at 26 in FIG. 1 represents a body of electrolyte solution contacting the display matrix 12, the generator electrodes 16 and the counter electrodes 18. The portion of the electrolyte solution 26 in contact with the display matrix 12 and the generator electrodes 16 initially contains a component of each of two redox couples. As indicated above, any components of the redox couples that would interfere with the operation of the counter electrodes 18 are excluded or confined away from the region of the counter electrodes 18 by the separator 24. The initial component of one redox couple is in the reduced form while the initial component of the other redox couple is in the oxidized form. The electrolyte solution 26 may also include an inert supporting electrolyte. This may be a simple inorganic salt such as, for example, potassium chloride. The initial redox couple components must be compatible with one another and with the color-changing material of the display matrix 12 so that no color change or other change occurs until an electrical signal is applied to the display.

When a current is passed in the drive matrix with the selected generator electrodes 16 as the anode and the selected counter electrodes 18 as the cathode, an oxidizing agent is formed at the surfaces of the generator electrodes 16. This reactant diffuses across the layer of electrolyte solution 26 from the generator electrodes 16 to the correspondingly selected or addressed color-changing material in the display matrix 12. The oxidizing agent reacts with the color-changing material to change its color and, in the process, is regenerated as the initial redox component in the reduced state. Thus, the soluble redox system mediates, or couples, the color-changing material in the display matrix 12 to the generator electrodes 16 without being consumed itself. In the display cell 10, the anodic charge passed at the generator electrodes 16 should be that required to completely convert the amount of color-changing material present in the addressed elements of the display matrix 12. On controlled electrolysis in the opposite direction, the component of the other redox couple generates a reducing agent which reacts with the oxidized color-changing material and brings it back to it initial color state. It is apparent that there is no net change in the color-changing material or the reactants. Thus, the cycle should be repeatable many times. With some color-changing materials, if the reverse electrolysis is carried further by the passage of additional cathodic charge, the color-changing material may be reduced beyond its original color state to a third or even a fourth color state. Hence, in addition to being applicable to two-color displays, the scheme of this invention is adaptable to the operation of multicolor displays wherein the color-changing material has more than two color states.

As will be apparent to those skilled in the art, the above-recited process may be reversed in that the first reactant generated may be a reducing agent such as, for example $Fe(CN)_6^{3-}/Fe(CN)_6^{4-}$, to react with a suitable color-changing material to switch the material from its initial color state by reduction rather than by oxidation. It will also be apparent that further oxidized states may exist to provide additional colors.

By way of example, a suitable color-changing material for a display device 10 in accord with the invention is lutetium diphthalocyanine, initially in a green color state. The initial soluble redox component in the reduced form may be the bromide anion, $Br^-$. When a current is passed in the drive matrix with the selected generator electrodes 16 as the anode and the selected counter electrodes 18 as the cathode, the bromide anion is oxidized at the generator electrodes 16 to form bromine, $Br_2$. The bromine reactant diffuses across the electrolyte layer 26 to the display matrix 12 where the lutetium diphthalocyanine is switched from its initial green color to an orange or a red color state by oxidation. In the process, the initial redox component the bromide anion $Br^-$, is regenerated.

Figure 2:
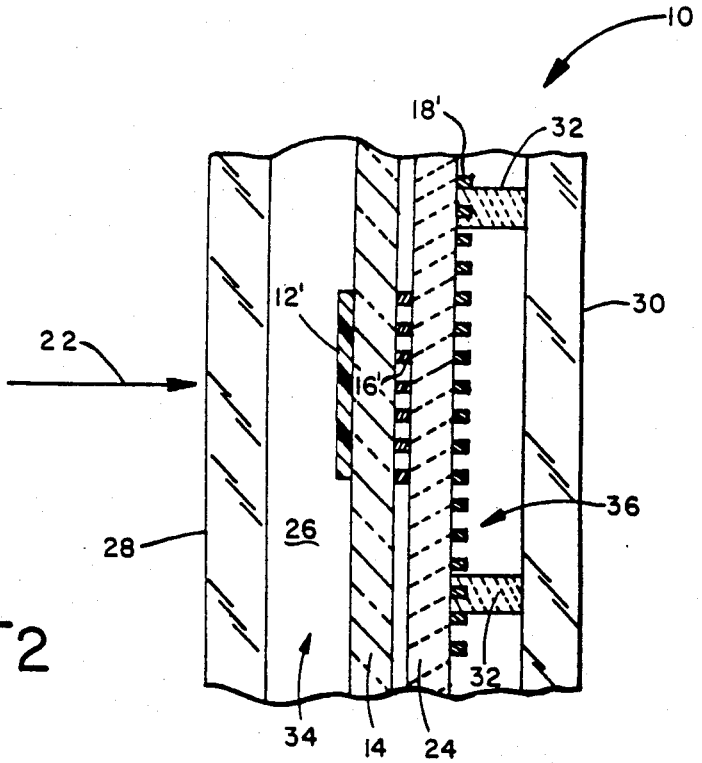
FIG. 2 illustrates a cross-section through a portion of a color-changing display device in accordance with the invention.

The cross-sectional view of the display device 10 in FIG. 2 is expanded to show certain of its details. A single generator electrode 16', having an open mesh structure, extends horizontally and perpendicular to the plane of the drawing. A single counter electrode 18', also having an open mesh structure, extends vertically and parallel to the plane of the drawing. Interposed between the generator electrode 16' and the counter electrode 18' is the selective separator 24.

A single, electronically isolated, distinct display element 12' of color-changing material is shown disposed on the porous substrate and spacer 14 and aligned with the distinct intersection or crossover region of generator electrode 16' and counter electrode 18'.

A front panel 28 for the display device envelope is of any suitable transparent material such as a clear plastic or glass. A rear panel 30 for the envelope may be of the same transparent material although it may be of an opaque material if the display is to be front-lighted.

Two compartments 34 and 36 containing the body of electrolyte 26 are shown in FIG. 2. The compartment 34, shown to the left of the separator 24, includes the generator electrode 16', the substrate and spacer 14 and the display element 12'. The compartment 34 contains that portion of the body of electrolyte 26 having the redox components therein which are needed to react at the generator electrode. The compartment 36, shown to the right of the separator 24, includes the counter electrode 18'. The compartment 36 contains that portion of the body of electrolyte 26 from which redox components are excluded unless some of them happen to be common to the counter-electrode system. For example, a component such as bromide ion can be one of the main redox components, so that $$2Br^- \rightarrow Br_2 + 2e$$

at the generator electrode. Sometimes the same component can be part of the counter electrode system:

$$AgBr + e \rightarrow Ag + Br^-.$$

In this case, one can use a separator 24 which is permeable to bromide ion.

The compartments 34 and 36 are shown in FIG. 2 to have substantial size for the purpose of providing an excess of reactants. Longer device life is thereby provided in the event of gradual depletion of the reactants when the display device 10 is put in service. Where depletion is not a factor, the display device 10 can be made more compact by making the compartments 34 and 36 smaller.

In the embodiment of FIGS. 1 and 2, the substrate and spacer 14 supporting display element 12' controls the displacement between display element 12' and generator electrode 16'. The spacer 14 may be transparent, translucent or, when it is used as optical backing in a front-lighted display, white. It is necessary that the spacer 14 have relatively high porosity. Electrolyte 26 fills the spacer pores which must be large enough to permit virtually unobstructed passage of the soluble reactants.

The displacement or distance between the display element 12' and the portion of the generator electrode 16' in the crossover region of generator and counter electrodes 16' and 18' is very small. This is necessary for rapid switching of color, since a reactant must travel by diffusion from its generation site across a layer of the electrolyte 26 to display element 12'.

On the other hand, the distance from the intersection or crossover region of generator and counter electrodes 16' and 18' to the display elements adjacent to display element 12' in display matrix 12 is preferably sufficiently great that diffusion of reacants to these adjacent display elements from the selected electrode crossover region is insufficient to create a visible effect.

The electrolyte properties and the spacing between the generator electrodes 16 and the counter electrodes 18 in the drive matrix should be chosen to give good resolution, i.e., to generate reactant only at the selected intersections. This condition is approached by making that portion of the drive matrix between the generator electrodes 16 and the counter electrodes 18 relatively thin and of relatively high resistivity. Resolution is improved further if the separator 24 is a membrane having pores extending perpendicular to the membrade surface so that the effective resistivity of the electrolyte-membrane layer is anisotropic. A threshold voltage in the electrochemical current-voltage characteristic at the generator or counter electrode surface is also conducive to good resolution.

It is preferable in the type of display described to address a selected display element with a current pulse, rather than a voltage pulse, since it is the amount of charge passed in generating a given amount of reactant which is most closely related to the amount of color-changing material to be switched. However, a voltage pulse of suitably controlled amplitude and duration may also be used.

Shown at 32 is a support for the multilayered central structure of the display device 10 comprising the display matrix 12 and the drive matrix. The support 32 is preferably porous. It is also preferably transparent if the display device 10 is back-lighted. It may be discontinuous, vis, fabricated as a plurality of small spacer pads distributed over the structure.

Although it is important to control the various thicknesses in the multilayer device structure according to the invention, this control is not as difficult to achieve as in the fabrication of liquid crystal display devices wherein relatively large rigid plates must be positioned close together. The layer thicknesses in the present device can be achieved by screening or lamination techniques.

Figure 3:
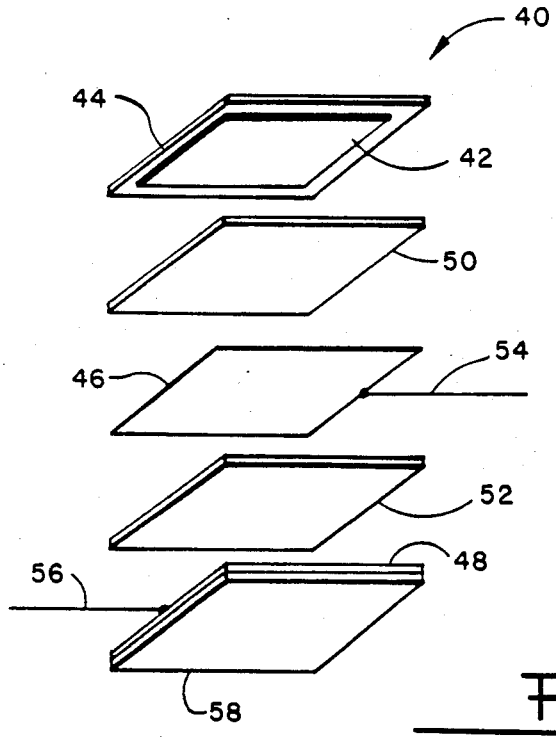
FIG. 3 is an exploded view of an optical filter in accordance with the invention.

Referring now to FIG. 3, there are shown the essential parts of a chemically coupled, color-changing optical filter 40. As shown, a cell housing for the filter 40 includes an upper portion 44 and a lower portion 58 enclosing a cell housing cavity. A filter element 42 comprising a light-transmissive film of an insoluble color-changing material is disposed on an interior surface of the upper cell housing portion 44. The filter element 42 may be of any insoluble color-changing material which is capable of reversibly changing color by reaction with soluble oxidizing and reducing agents that are electrochemically generated.

The upper cell housing 44 may be of any material which is compatible with the color-changing material such as, for example, a plastic, glass or alumina.

The housing material and the color-changing material preferably have substantially the same thermal expansion coefficient so as to promote good adhesion. The better the adhesion, the longer will be the life of the device 40.

In order for the device 40 to act as a light filter, both the upper portion 44 and the lower portion 58 of the cell housing must be transparent, at least in the viewing region.

The remainder of the device parts in FIG. 1 comprise the drive means for electrochemically generating the reactants, i.e., the soluble oxidizing and reducing agents. The reactants interact with the color-changing material to alter its color.

The drive means includes a generator electrode 46 of a transparent conductive material such as, for example, gold mesh. Generator electrode 46 is disposed substantially parallel to, spaced apart from and coextensive with the filter element 42.

Electrical contact with the generator electrode film 46 is preferably made everywhere along the outer edge of the film through a peripheral strip of metal and a conductor 54 extending external to the cell housing through a seal. Such geometry limits the ohmic resistance of the conductive film 46 to less than that of one square of the conductive material, even where the total area of the film 46 is large. This limitation on the electrical resistance of the generator electrode favors uniform and rapid response over the entire area of the filter element 42.

A counter electrode 48 is shown disposed on the interior side of the upper portion 58 of the cell housing. Since the central portion of the cell is shown occupied by the filter element 42, the counter electrode 48 is shown disposed around the outer portion of the cell housing cavity. A conductor 56 provides an electrical path leading from the counter electrode 48 external to the cell housing through a seal.

The cell housing cavity is filled with a body of electrolyte solution 50 in contact with the generator electrode 46, the filter element 42 and the counter electrode 48.

Interposed between the generator electrode 46 and the counter electrode 48 is a selective separator 52 which, in effect, divides the cell housing cavity into two compartments. The first or central compartment contains the counter electrode 48. The selective separator 52 prevents loss of electrochemically generated reactant species from the first compartment containing the generator electrode 46 and the filter element 42. Stated alternatively, the separator 52 excludes or confines the electrochemically generated reactant species away from the second compartment containing the counter electrode 48. Thus, the generated reactants are preserved for reaction with color-changing material only. In addition, the separator 52 is required to confine certain soluble chemical species to the compartment of the generator electrode 46 and filter element 42 and prevent contamination of the counter electrode 48 where these species could interfere with the operation of the counter electrode 48. Similarly, the separator 52 is required to confine certain other soluble chemical species to the second compartment of the counter electrode 48 and prevent contamination of the generator electrode 46 and of the color-changing material of the filter element 42 where these other species could interfere with the operation of the generator electrode 46 or with the operation of the color-changing material. However, the separator 52 does permit the passage of current-carrying ions between the generator and counter electrodes 46 and 48. A semi-permeable separator 52 made of, for example, an ion exchange resin is preferred but a retentive diffusion barrier containing electrolyte may serve as an adequate separator 52 in come cases. An ion exchange resin exhibits selective permeability due to its ability to transport primarily cations or anions. A retentive diffusion barrier retards the undesired passage of chemical species because of its microporous structure. The diffusion barrier can be a microporous structure of inert material fabricated by screening. Alternatively, the separator 52 may be a molecular filter having selective permeability due to its ability to transport only chemical species smaller than a certain size.

As has been indicated, the generator electrode 46 is preferably of a conductive, inert material such as, for example, gold mesh. The counter electrode 48 preferably includes an electrochemical couple with insoluble active components, such as silver-silver bromide, which will not impose special requirements on the separator 52. Soluble counter electrode couples such as iodide-triiodide are not ruled out, however, if an appropriate separator 52 is used. If both members of the counter-electrode couple are soluble, as in the case of iodide-triiodide, the separator 52 must be retentive enough to exclude the more active member, such as triiodide, from the region of the filter element 42.

The portion of the electrolyte solution 50 in contact with the filter element 42 and the generator electrode 46 initially contains a component of each of two redox couples. As indicated above, any components of the redox couples that would interfere with the operation of the counter electrode 48 are excluded or confined away from the region of the counter electrode 48 by the separator 52. The initial component of one redox couple is in the reduced form while the initial component of the other redox couple is in the oxidized form. The electrolyte solution 50 may also include an inert supporting electrolyte. This may be a simple inorganic salt such as, for example, potassium chloride. The initial redox couple components must be compatible with one another and with the color-changing material of the filter element 42 so that no color change or other change occurs until an electrical signal is applied to the device.

When a current is passed in the drive means with the generator electrode 46 as the anode and the counter electrode 48 as the cathode, an oxidizing agent is formed at the surface of the generator electrode 46. This reactant diffuses across the layer of electrolyte solution 50 from the generator electrode 46 to the color-changing material in the filter element 42. The oxidizing agent reacts with the color-changing material to change its color and, in the process, is regenerated as the initial redox component in the reduced state. Thus, the soluble redox system mediates, or couples, the color-changing material in the filter element 42 to the generator electrode 46 without being consumed itself. In the device 40 the anodic charge passed at the generator electrode 46 should be that required to completely convert the amount of color-changing material present in the filter element 42. On controlled electrolysis in the opposite direction, the component of the other redox couple generates a reducing agent which reacts with the oxidized color-changing material and brings it back to its initial color state. It is apparent that there is no net change in the color-changing material or the reactants. Thus, the cycle should be repeatable many times. With some color-changing materials, if the reverse electrolysis is carried further by the passage of additional cathodic charge, the color-changing material may be reduced beyond its original color state to a third or even a fourth color state. Hence, in addition to being applicable to two-color displays, the scheme of this invention is adaptable to the operation of multicolor displays wherein the color-changing material has more than two color states.

As will be apparent to those skilled in the art, the above-recited process may be reversed in that the first reactant generated may be a reducing agent to react with a suitable color-changing material to switch the material from its initial state by reduction rather than by oxidation. It will also be apparent that further oxidized states may exist to provide additional colors.

By way of example, a suitable color-changing material for a device 40 in accordance with the invention is lutetium diphthalocyanine, initially in a green color state. The initial soluble redox component in the reduced form may be the bromide anion, $Br^-$. When a current is passed in the drive means with the generator electrode 46 as the anode and the counter electrode 48 as the cathode, the bromide anion is oxidized at the generator electrode 46 to form bromine, $Br_2$. The bromine reactant diffuses across the electrolyte 50 to the filter element 42 where the lutetium diphthalocyanine is switched from its initial green color to a red color state by oxidation. In the process, the initial redox component, the bromide anion $Br^-$, is regenerated.

Figure 4:
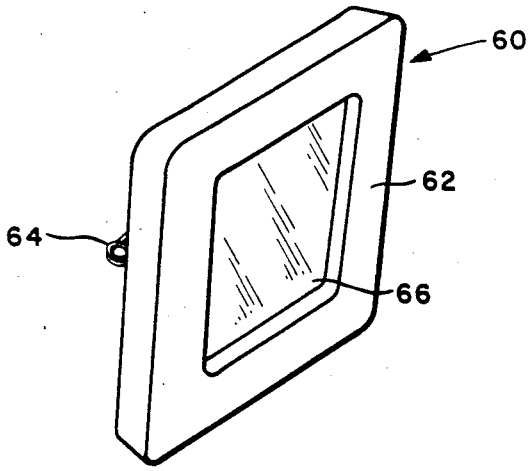
FIGS. 4 and 5 are perspective views of chemical sensing devices in accordance with the invention.
Figure 5:
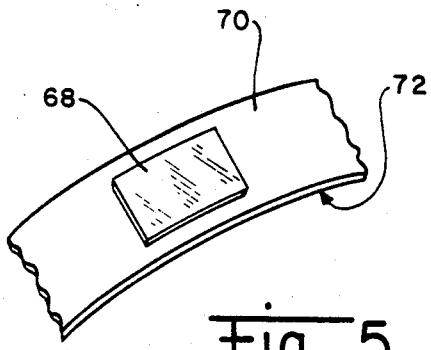

Referring now to FIG. 4, there is shown a non-electronic chemical sensing device for indicating the presence of at least a minimal level of a hazardous gas such as chlorine. The device 60 comprises a badge-like frame 62 having means 64 for attaching device 60 to a garment or other surface, and an exposed film 66 of surfactant-treated color changing display material. Alternatively, as shown in FIG. 5, a film 68 of color changing material may be disposed as a suitable flexible support to having an adhesive 72 on the reverse side thereof, for application to a surface. Upon exposure to gaseous chlorine, for example, the surfactant-treated material undergoes a color change.

The electrochromic metal diphthalocyanine is a complex molecule comprising two phthalocyanine ring structures which are generally believed to lie in substantially parallel planes with a metalion disposed between the planes occupied by the phthalocyanine rings. In a preferred embodiment, the metal in the complex is yttrium, scandium or a rare earth of the lanthanide series; however, other metals whose diphthalocyanine complexes are electrochromic may be used. In a presently preferred embodiment, the metal diphthalocyanine complex is lutetium diphthalocyanine.

The metal diphthalocyanine complexes for utilization in this invention may be synthesized by methods which have been described in the literature. It is preferred to purify the metal-diphthalocyanine complexes by vacuum sublimation in order to obtain high purity films of the diphthalocyanine complexes in display cells. The diphthalocyanine film is preferably deposited by vacuum sublimation of a diphthalocyanine at pressures on the order of $10^{-6}$ mm to $10^{-5}$ mm of Hg. During sublimation of the diphthalocyanine the source of the diphthalocyanine is held at a temperature which provides a reasonable deposition rate without destroying the complex. This temperature may be in the range of about 300° C. to 400° C.

The color changing material film thickness should be in the range of about 0.05 to 1.0 micron, preferably about 0.1 to 0.2 microns depending on the intensity of color desired.

The color changing material is treated, prior to use, with at least one surface-active agent carried in a suitable liquid vehicle, as disclosed in the aforementioned application Ser. No. 330,041, filed Dec. 11, 1981. A suitable mixture for treating the electrochromic display material consists essentially of about one to one-and-one-half grams per liter of both substituted imidazoline and silicone glycol in approximately equal proportions in acetone. The acetone mixes sufficiently well with the surfactants so that a satisfactory deposit of surfactants is formed when the acetone is removed. A satisfactory deposit is one that is uniform and free of spotting. Acetone has an advantage in that it is highly volatile and may be readily driven off by air drying. Other, less volatile liquid vehicles may be removed by careful heating and/or evaporation under vacuum.

The electrolytes 26 and 52 consist essentially of at least one color switching agent and a fluid carrier. The color switching agent is an oxidizing agent such as, for example, potassium ferricyanide, ceric nitrate, ceric sulfate, potassium dichromate, bromine, chlorine, and the like. The fluid carrier is an aqueous electrolyte such as, for example, 1N $H_2SO_4$, 1N $HClO_4$, 1N HCl, 1N KCl and the like, or, in the case of bromine and chlorine, the gas itself. The concentration of the color switching agent in the fluid carrier can range from about 0.001N to about 0.1N, preferably about 0.01N.

The following example illustrates the invention:

EXAMPLE

The responses of green lutetium diphthalocyanine films on tin oxide to various electrolyte-redox systems are given in the following table. The films were treated using a dilute solution of Dow-Corning 193 (silicone glycol) and Witcamine AL 42-12 (imidazoline/tall oil derivative).

TABLE

| Electrolyte-Redox System | | | |
|---|---|---|---|
| Couple | E° V vs. SHE | Observed Color | Reaction Time (sec) |
| $Fe^{3+}/Fe^{2+}$ 1N $H_2SO_4$ | 0.68 | Olive | 240 |
| $Fe^{3+}/Fe^{2+}$ 1N $HClO_4$ | 0.75 | Orange | 240 |
| $Fe^{3+}/Fe^{2+}$ 1N HCl | 0.77 | Orange | 120 |
| $Br_2/Br^-$ (Gaseous) | 1.09 | Orange | 15 |
| $Cr_2O_7^{2-}/Cr^{3+}$ dilute $H_2SO_4$ | 1.35 | Orange, Slight Olive | 120 |
| $Cl_2/Cl^-$ (Gaseous) | 1.36 | Orange | 5 |
| $Ce^{4+}/Ce^{3+}$ dilute $H_2SO_4$ | 1.44 | Orange | 5 |

While the invention has been described with respect to preferred embodiments thereof, it will be appreciated by those skilled in the art that various changes in form and detail may be made therein without departing from the spirit and scope of the invention.

We claim:

1. In a device comprising a matrix having a plurality of distinct electronically isolated elements of a solid insoluble display material capable of changing color by reaction with soluble reactants; and drive means for electronically generating said soluble reactants at a distinct region in said drive means, wherein one distinct region in said drive means is associated with one of said distinct elements of the display material;

wherein a selected one of said distinct elements of display material receives said soluble reactants by diffusion from said one distinct region in said drive means associated therewith, the improvement wherein said display material is a surfactant-treated color changing metal-diphthalocyanine complex.

2. The device of claim 1 wherein said complex is a lutetium diphthalocyanine complex.

3. The device of claim 1 wherein said soluble reactants are selected from the group consisting of $Fe^{3+}/Fe^{2+}$, $Ce^{4+}/Ce^{3+}$, $Cr_2O_7^{2-}/Cr^{3+}$, $Br_2/Br^-$ and $Cl_2/Cl^-$.

4. The device of claim 3 wherein at least one of said soluble reactants is carried in aqueous fluid carrier solution.

5. The device of claim 4 wherein said fluid carrier is an aqueous acid solution.

6. The device of claim 1 wherein said display material is a metal diphthalocyanine complex treated with a mixture of silicone glycol and imidazoline surfactants.

7. A chemical sensing device comprising a film of surfactant-treated color changing metal-diphthalocyanine complex and means for supporting said film.

8. The device of claim 7 wherein said supporting means is a frame including means for attaching said supporting means to a surface.

9. The device of claim 7 wherein said supporting means is a flexible support having an adhesive backing.

10. The device of claim 7 wherein said complex is lutetium diphthalocyanine.

* * * * *